US012210315B2

(12) United States Patent
Azami et al.

(10) Patent No.: US 12,210,315 B2
(45) Date of Patent: Jan. 28, 2025

(54) IMAGE FORMING APPARATUS WITH AIR FLOW GENERATION AND ENVIRONMENTAL SENSOR

(71) Applicant: CANON KABUSHIKI KAISHA, Tokyo (JP)

(72) Inventors: Junya Azami, Shizuoka (JP); Seiji Inada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/130,984

(22) Filed: Apr. 5, 2023

(65) Prior Publication Data

US 2023/0341811 A1 Oct. 26, 2023

(30) Foreign Application Priority Data

Apr. 21, 2022 (JP) ................................ 2022-070168

(51) Int. Cl.
*G03G 21/20* (2006.01)
*G03G 15/00* (2006.01)

(52) U.S. Cl.
CPC .......... *G03G 21/203* (2013.01); *G03G 15/80* (2013.01); *G03G 21/206* (2013.01); *G03G 2215/00978* (2013.01); *G03G 2221/1645* (2013.01)

(58) Field of Classification Search
CPC .... G03G 21/203; G03G 15/80; G03G 21/206; G03G 21/20; G03G 2215/00978; G03G 2221/1645
See application file for complete search history.

(56) References Cited

U.S. PATENT DOCUMENTS

2006/0114654 A1* 6/2006 Kiyosumi .............. B41J 29/377 361/695
2016/0209806 A1* 7/2016 Shiomi ................ G03G 21/206
2016/0378060 A1* 12/2016 Tani ..................... G03G 21/206 399/92
2017/0139370 A1* 5/2017 Matsuno ............ G03G 21/1619

FOREIGN PATENT DOCUMENTS

JP 2004-020683 A 1/2004
JP 2009-265280 A 11/2009
JP 2009271237 A * 11/2009
JP 2010-078805 A 4/2010
JP 2013152495 A * 8/2013

* cited by examiner

*Primary Examiner* — Arlene Heredia
*Assistant Examiner* — Laura Roth
(74) *Attorney, Agent, or Firm* — Venable LLP

(57) ABSTRACT

An image forming apparatus includes a casing accommodating an image forming unit, a fan, a duct member, an electric component, and a sensor unit. The casing includes a cover member, an air inlet opening, and an air outlet opening. The fan is configured to take in air from an upstream side with respect to a second direction and blow out the air to a downstream side with respect to the second direction such that the air flow flowing through the air inlet opening, the fan, the duct member, and the air outlet opening is generated. The sensor unit is arranged within a region between the air inlet opening and a rotational axis of the fan with respect to a first direction, and is arranged on an upstream side of the fan with respect to the second direction.

20 Claims, 15 Drawing Sheets

IMAGE FORMING APPARATUS WITH AIR FLOW GENERATION AND ENVIRONMENTAL SENSOR

BACKGROUND OF THE INVENTION

Field of the Invention

The present invention relates to an image forming apparatus that forms an image on a recording material.

Description of the Related Art

An image forming apparatus such as a printer, a copier, or a multifunction peripheral changes operation settings for image formation according to conditions (hereinafter referred to as environmental conditions) such as temperature and humidity of an environment in which the image forming apparatus is installed. Therefore, the image forming apparatus includes sensors for measuring environmental conditions.

Japanese Patent Laid-Open No. JP 2010-078805 A describes an arrangement example of a temperature and humidity sensor disposed in a casing of an image forming apparatus. According to this document, two ventilation ports are formed in an exterior cover covering a frame of an image forming apparatus, a temperature and humidity sensor is disposed between the two ventilation ports in a gap between the exterior cover and the frame, and a discharge fan for discharging air in the gap from one of the ventilation ports is disposed.

However, in the arrangement of the temperature and humidity sensor described in the above document, not only the outside air flowing from the ventilation port on the intake side but also the air flowing from the inside of the image forming apparatus toward the discharge fan passes through the temperature and humidity sensor. Therefore, during the execution of the image forming operation, the temperature in the vicinity of the temperature and humidity sensor gradually increases due to the air heated inside the image forming apparatus, and the measurement accuracy of the temperature and humidity may decrease.

SUMMARY OF THE INVENTION

The present invention provides an image forming apparatus that can improve detection accuracy of an environmental condition during execution of an image forming operation.

According to one aspect of the invention, an image forming apparatus includes a casing accommodating an image forming unit that is configured to form an image on a recording material, a fan disposed inside the casing and configured to generate an air flow, a duct member disposed inside the casing and configured to form a flow path for the air flow, an electric component disposed inside the duct member, and a sensor unit disposed inside the casing and configured to detect an environmental condition around the casing, wherein the casing includes a cover member constituting at least a part of an exterior surface of the casing in a first direction, an air inlet opening provided in the cover member, and an air outlet opening provided at a position downstream of and away from the air inlet opening in a second direction along the cover member, wherein the fan is configured to take in air from an upstream side in the second direction and blow out the air to a downstream side in the second direction such that the air flow flowing through the air inlet opening, the fan, the duct member, and the air outlet opening is generated, and wherein the sensor unit is arranged within a region between the air inlet opening and a rotational axis of the fan in the first direction, and is arranged on an upstream side of the fan in the second direction.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

First Embodiment

Casing of Image Forming Apparatus

Figure 1:
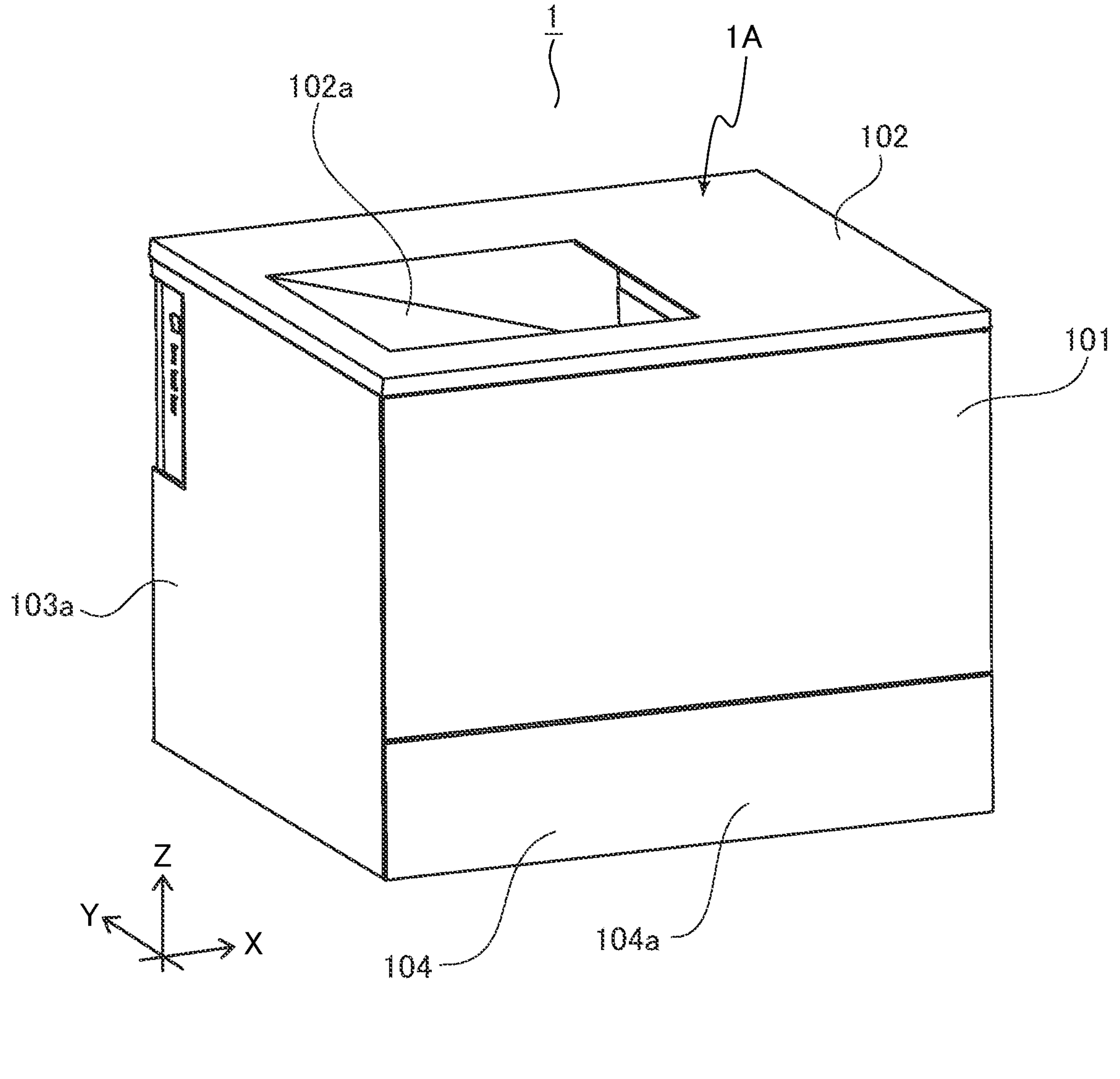
FIG. 1 is an external view of an image forming apparatus according to a first embodiment when viewed from a front side.
Figure 2A:
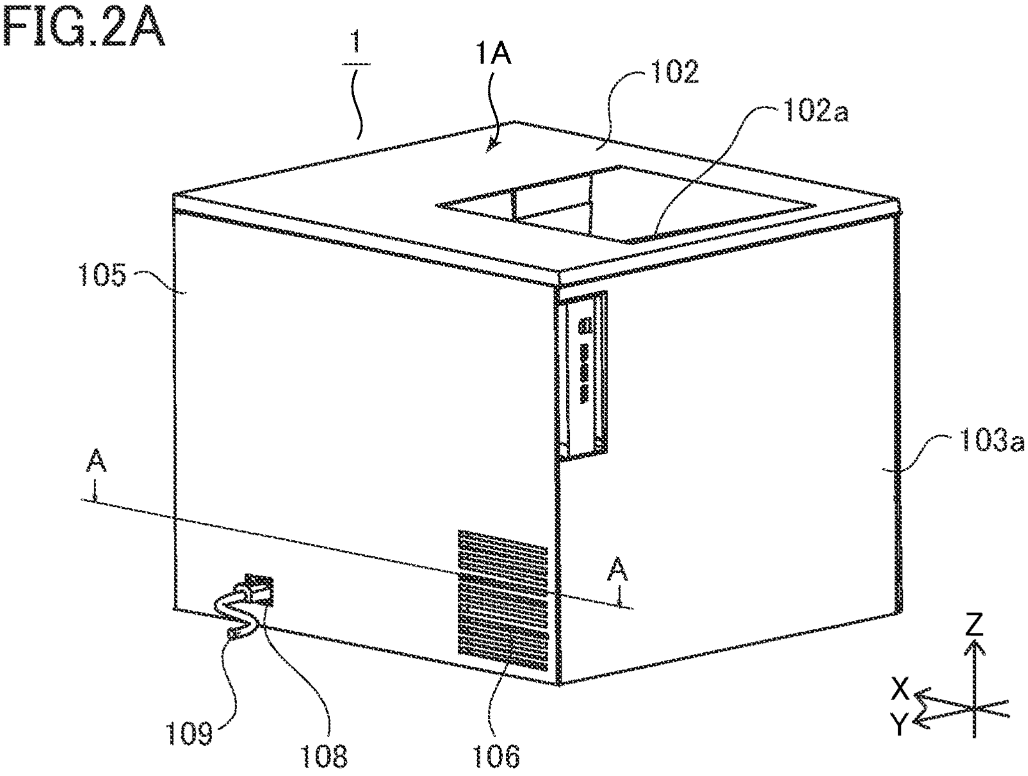
FIGS. 2A and 2B are external views of the image forming apparatus according to the first embodiment when viewed from a back side.
Figure 2B:
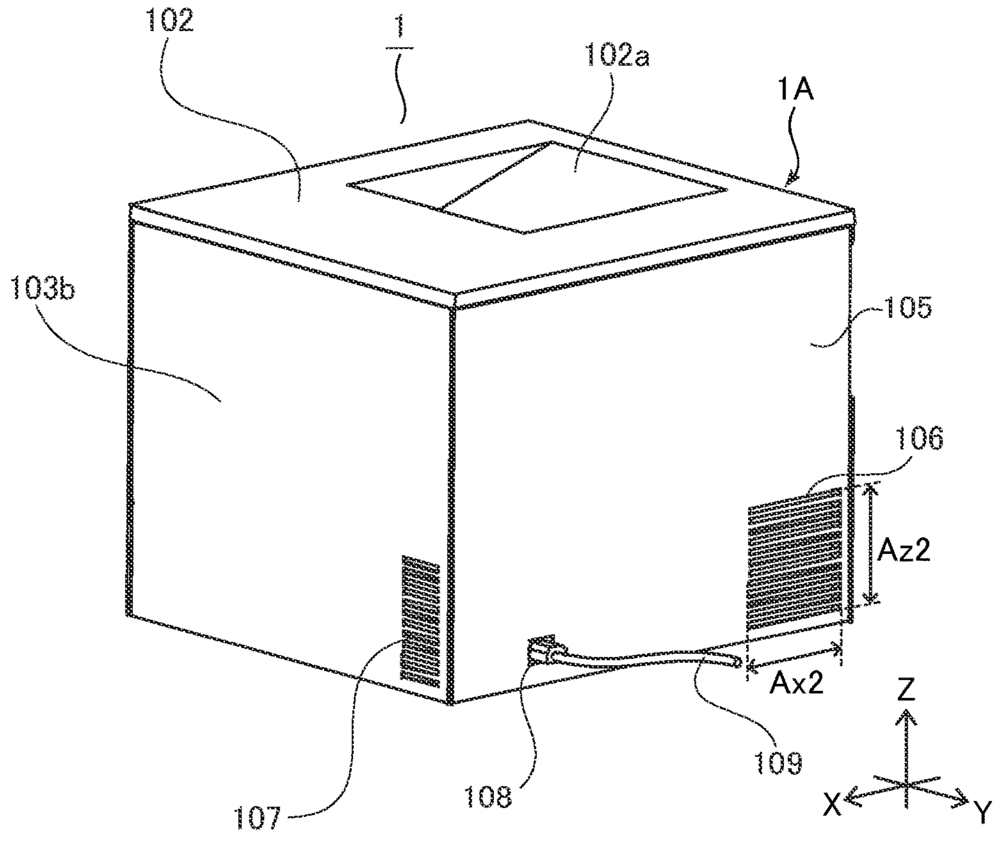

An appearance of an image forming apparatus 1 according to an embodiment (a first embodiment) will be described with reference to FIG. 1 and FIGS. 2A and 2B. FIG. 1 is a view of the image forming apparatus 1 when viewed from the front side, and FIGS. 2A and 2B are views of the image forming apparatus 1 when viewed from the back side. The term "front" as used herein refers to a side facing the user when the user stands in front of the image forming apparatus 1 to remove an output product, replenish a recording material, or replace consumables. The front surface of the image forming apparatus 1 can be confirmed, for example, in a product manual. A surface opposite to the front surface of the image forming apparatus 1 is referred to as a "back surface".

In the following description, an upward direction in the vertical direction (direction along the gravity direction) when the image forming apparatus 1 is installed on a horizontal plane is referred to as a Z direction, and a downward direction in the vertical direction is referred to as a −Z direction. Among horizontal directions orthogonal to the Z direction, a direction along one surface of the casing of the image forming apparatus 1 is referred to as an X direction, and a direction orthogonal to the X direction is referred to as a Y direction. In the present embodiment, the X direction is a direction from the left side to the right side when viewed from the front side of the image forming apparatus 1, and the opposite direction is referred to as a −X direction. The Y direction is a direction from the front side to the back side of the image forming apparatus 1, and the opposite direction is referred to as a −Y direction. In addition, units and components assembled in the image forming apparatus 1 will be described using X, Y, and Z directions based on the orientation in the assembled state unless otherwise specified.

As illustrated in FIG. 1 and FIGS. 2A and 2B, the image forming apparatus 1 includes a casing 1A (apparatus body) having a substantially rectangular parallelepiped shape. The casing 1A includes frames constituting a frame body of the image forming apparatus 1 and an exterior that covers the frames. The exterior includes a front door 101, an upper surface cover 102, side surface covers 103*a* and 103*a*, and a back surface cover 105. In addition, a front cover portion 104*a* of a cassette 104 which is attached to the lower portion of the casing 1A in a drawable manner is also a part of the exterior of the casing 1A.

The front door 101 constitutes an upper portion of the front surface of the casing 1A. The front cover portion 104*a* of the cassette 104 constitutes a lower portion of the front surface of the casing 1A. The front door 101 is rotatably (openably and closably) supported by the frame of the casing 1A. Ina state where the front door 101 and the cassette 104 are closed, the exterior surface of the front door 101 and the front cover portion 104*a* of the cassette 104 have a planar shape (flat-plate shape) that intersects the Y direction substantially perpendicularly and extends in the X direction and the Z direction.

The side surface cover 103*a* constitutes a side surface of the casing 1A in the −X direction, and the side surface cover 103*b* constitutes a side surface of the casing 1A in the X direction. The side surface covers 103*a* and 103*b* each have a planar shape (flat-plate shape) that intersects the X direction substantially perpendicularly and extends in the Y direction and the Z direction. The side surface cover 103*b* is provided with a discharge louver 107 to be described below.

The upper surface cover 102 constitutes an upper surface (a surface in the Z direction) of the casing 1A. The upper surface cover 102 has a planar shape (flat-plate shape) that extends in the X direction and the Y direction while intersecting the Z direction substantially perpendicularly. The upper surface cover 102 is provided with a stacking portion 102*a* on which a recording material on which an image is formed is stacked as a product.

The back surface cover 105 constitutes a back surface of the casing 1A. The back surface cover 105 constitutes at least a part (all in the present embodiment) of the exterior surface of the casing 1A in the Y direction serving as the first direction. The back surface cover 105 has a planar shape (flat-plate shape) that intersects the Y direction substantially perpendicularly and extends in the X direction and the Z direction. The back surface cover 105 is provided with an intake louver 106 to be described below and a cord hole 108 which is an opening for inserting a power cord 109.

Inside of Image Forming Apparatus

Figure 3:
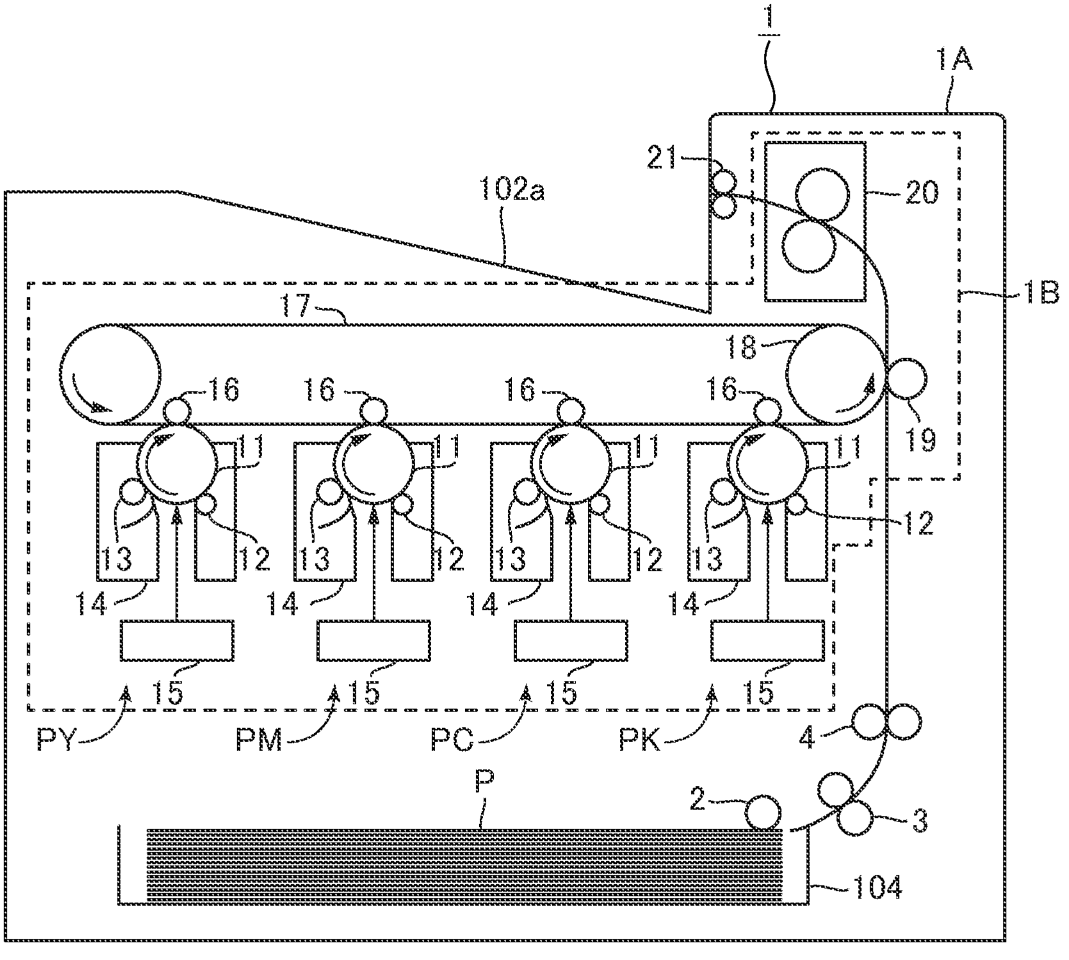
FIG. 3 is a schematic diagram illustrating an internal configuration of the image forming apparatus according to the first embodiment.

FIG. 3 is a diagram schematically illustrating an internal structure of the image forming apparatus 1. The image forming apparatus 1 of the present embodiment is an in-line color laser beam printer, and is configured to output a color image by superimposing toners that are developers of four colors of yellow (Y), magenta (M), cyan (C), and black (K).

As illustrated in FIG. 3, an electrophotographic mechanism 1B serving as an image forming unit is accommodated inside the casing A. The electrophotographic mechanism 1B includes process units PY, PM, PC, and PK each having an image bearing member, an intermediate transfer belt 17 serving as an intermediate transfer body, a secondary transfer roller 19 serving as a transfer member, and a fixing unit 20 as an example of a fixing unit. The electrophotographic mechanism 1B forms an image on the recording material P by an electrophotographic process.

Each of the process units PY to PK includes a photosensitive drum 11 serving as an image bearing member, a charging roller 12 serving as a charging unit, a developing roller 13 serving as a developing unit, and a laser scanner 15 serving as an exposure unit. The photosensitive drum 11, the charging roller 12, and the developing roller 13 are disposed in the cartridge 14 of each process unit PY to PK. Each cartridge 14 contains a developer containing toner of the color of the image to be formed by the process unit PY, PM, PC, or PK to which the cartridge belongs.

The intermediate transfer belt 17 is stretched around a plurality of rollers including a driving roller 18 (secondary transfer inner roller). The outer surface of the intermediate transfer belt 17 faces the photosensitive drum 11 of each of the process units PY to PK. On the inner peripheral side of the intermediate transfer belt 17, primary transfer rollers 16 are disposed at positions facing respective photosensitive drums 11 with the intermediate transfer belt 17 interposed therebetween. A secondary transfer portion is formed as a nip portion between the secondary transfer roller 19 and the intermediate transfer belt 17.

The fixing unit 20 has a configuration of a heat fixing system including a rotary member pair including a belt (film) or a roller and a heating unit that heats an image (toner image) on a recording material. As the heating unit, for example, a halogen lamp that heats the rotary member by radiant heat, a heater board having a resistance heating element that generates heat by being supplied electric current to heat the rotary member by thermal conduction, an induction heating mechanism that heats the conductive layer of the rotary member by induction heating, or the like can be used.

In addition, the image forming apparatus 1 includes a feed roller 2, a conveyance roller pair 3, a registration roller pair 4, and a sheet discharge roller pair 21 as a conveying unit that conveys the recording material P. The feed roller 2 serves as a sheet feed unit that feeds the recording material P from the cassette 104 (storage compartment, mounting part). The conveyance roller pair 3 is a separation conveyance unit that feeds the recording material P while separating the recording materials P one by one. The sheet discharge roller pair 21 is a discharge unit that discharges the recording material P to the outside of the casing 1A. Note that, as the recording material P, various sheet materials having different sizes and materials, such as paper such as plain paper and thick paper, a plastic film, cloth, a sheet material subjected to surface treatment such as a coated paper, and a sheet material having a special shape such as an envelope and index paper, can be used.

Figure 4:
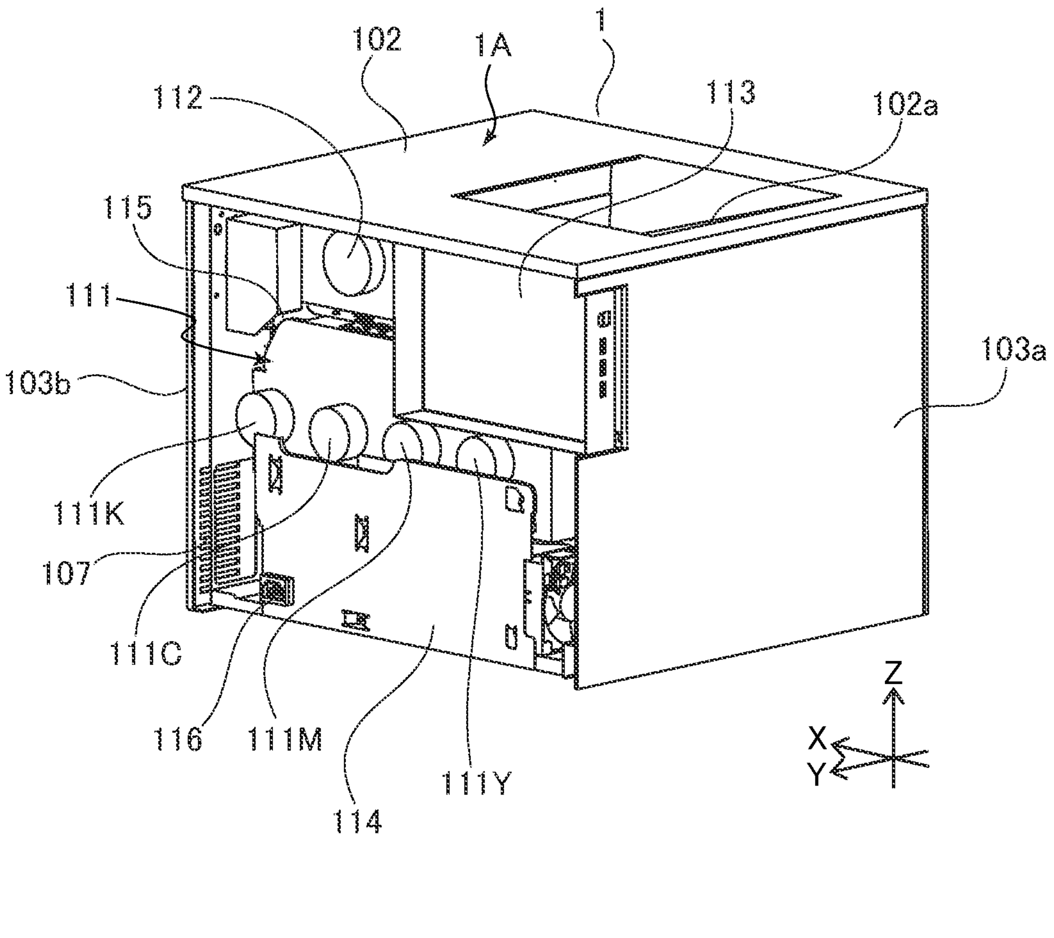
FIG. 4 is a view illustrating a state in which a back surface cover of the image forming apparatus according to the first embodiment is removed.

FIG. 4 illustrates the image forming apparatus viewed from the back side in a state in which the back surface cover 105 of the image forming apparatus 1 is removed. The image forming apparatus 1 includes a main drive unit 111, a fixing motor 112, a controller 113, and a low-voltage power supply unit 114. In the present embodiment, these electric devices are disposed on the backside in the casing 1A. In addition, the image forming apparatus 1 includes a high-voltage power supply unit that applies a high voltage to process portions (charging roller 12, developing roller 13, primary transfer roller 16, and secondary transfer roller 19) of the electrophotographic mechanism 1B.

The main drive unit 111 includes main motors 111Y, 111M, 111C, and 111K that supply driving force for rotationally driving the photosensitive drums 11, the developing rollers 13, and the like to the process units PY to PK, gears that distribute and transmit the driving force to a driving target, and the like. The fixing motor 112 rotationally drives a rotary member pair of the fixing unit 20. The controller 113 controls the operation of the image forming apparatus 1 and communicates with an external computer or network.

The low-voltage power supply unit 114 supplies power for operating actuators such as the main motors 111Y to 111K and the fixing motor 112, the controller 113, the laser scanners 15, and the heating unit of the fixing unit 20. The low-voltage power supply unit 114 includes a power supply inlet 116 for receiving power supply from an external power source (for example, commercial power supply) by being connected with a power cord 109 (FIGS. 2A and 2B).

The casing 1A has a rear plate 115 that is apart of the frame body. The main drive unit 111, the controller 113, and the low-voltage power supply unit 114 are positioned by the rear plate 115, whereby the positions of the units in the casing 1A are fixed.

Image Forming Operation

Next, an image forming operation of the image forming apparatus 1 will be described with reference to FIG. 3. The image forming apparatus 1 starts an image forming operation when the controller 113 receives image data from an external computer or the like.

In the image forming operation, first, the photosensitive drums 11 and the intermediate transfer belt 17 are rotationally driven by the driving force from the main drive unit 111, and each charging roller 12 uniformly charges the surface of the corresponding photosensitive drum 11. Each laser scanner 15 flashes based on the image data received by the controller 113 to form an electrostatic latent image on the surface of the corresponding photosensitive drum 11. This electrostatic latent image is developed by the developing roller 13 using a developer and visualized as a monochromatic toner image. The toner image formed on each photosensitive drum 11 is transferred onto the intermediate transfer belt 17 by the primary transfer roller 16. In transferring, the toner images of the respective colors overlap each other on the intermediate transfer belt 17 to form a color image (hereinafter, the image is simply referred to as an image).

On the other hand, the recording materials P stacked on the cassette 104 are fed one by one by the feed roller 2 and the conveyance roller pair 3. The registration roller pair 4 performs skew correction of the recording material P, and then sends the recording material P to the secondary transfer portion in synchronization with the timing at which the image formed on the intermediate transfer belt 17 reaches the secondary transfer portion. Then, in the secondary transfer portion, the image is transferred from the intermediate transfer belt 17 to the recording material P by the secondary transfer roller 19.

While the recording material P having passed through the secondary transfer portion passes through the fixing unit 20, the image is heated and pressurized, whereby the image is fixed to the recording material P. Thereafter, the recording material P is discharged to the outside of the casing 1A by the sheet discharge roller pair 21, and is stacked on the stacking portion 102*a* as a product.

When a job (continuous image forming job) for continuously forming images on a plurality of recording materials P is input, the image forming apparatus 1 forms an image on each of the recording materials P by the electrophotographic mechanism 1B while feeding the recording materials P one by one from the cassette 104. As a result, the image forming apparatus 1 forms an image on each recording material P while conveying a plurality of recording materials P at predetermined intervals at a constant throughput.

Low-Voltage Power Supply Unit

Figure 5A:
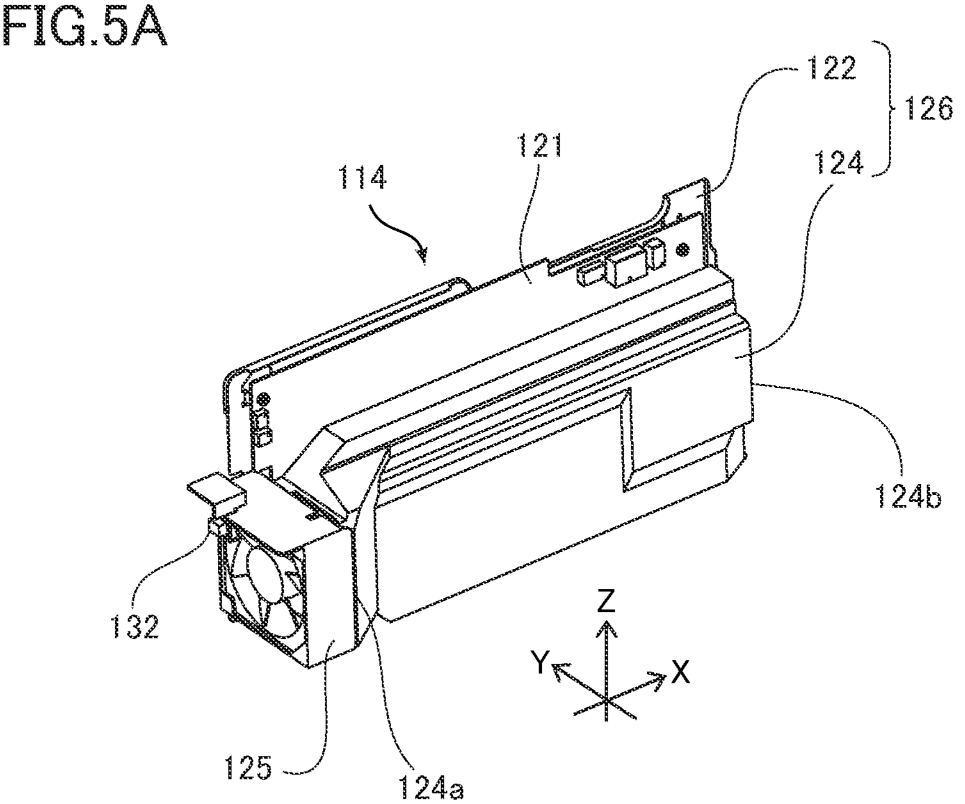
FIG. 5A is a perspective view of a low-voltage power supply unit according to the first embodiment.
Figure 5B:
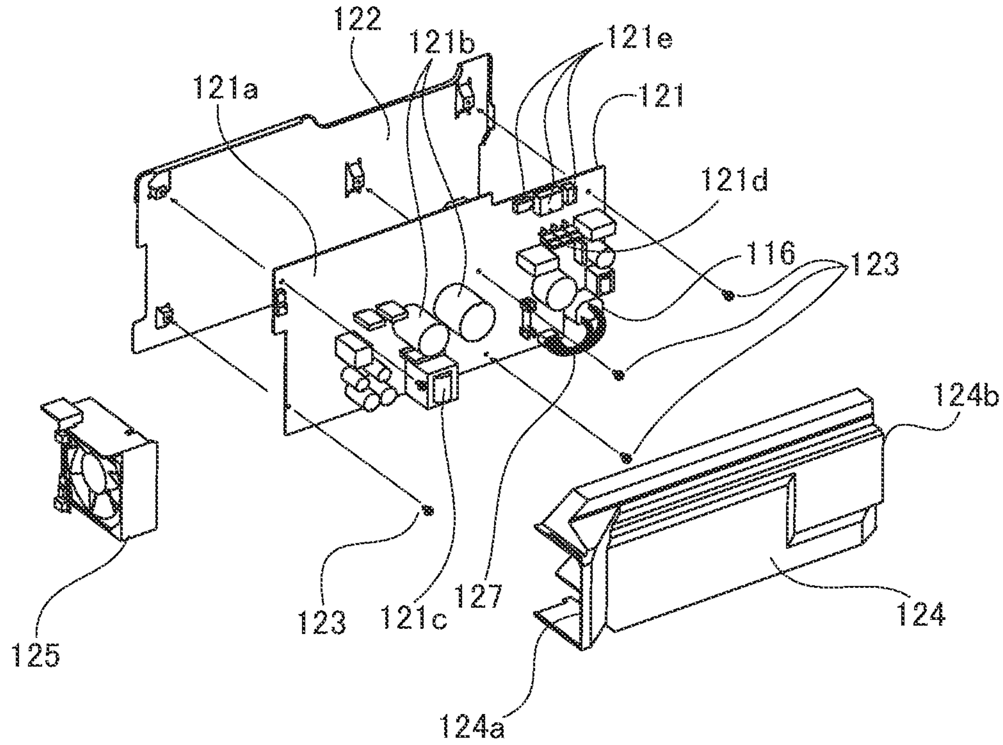
FIG. 5B is an exploded view of the low-voltage power supply unit according to the first embodiment.

Details of the low-voltage power supply unit 114 will be described with reference to FIGS. 5A and 5B. FIG. 5A is a perspective view of the low-voltage power supply unit 114 when viewed from the front side (−Y side), and FIG. 5B is an exploded view of the low-voltage power supply unit 114. The low-voltage power supply unit 114 is a unit elongated in the X direction. The low-voltage power supply unit 114 is disposed on the back side (+Y side) and the lower side (−Z side) inside the casing 1A (FIG. 4).

As illustrated in FIGS. 5A and 5B, the low-voltage power supply unit 114 includes a power supply board 121, a stay 122, a duct cover 124, a fan unit 125, and a power supply inlet 116 (see also FIG. 4).

The power supply board 121 is a circuit board including a substrate 121*a* and a plurality of electric components which are components of a power supply circuit formed on the substrate 121*a*. The electric component (electric element) includes a capacitor 121*b*, a transformer 121*c*, and a field-effect transistor (FET) 121*d* The power supply circuit including these electric components generates a direct current (DC voltage) and supplies the direct current to the motor, the controller 113, the fixing unit 20, and the like. Further, on the substrate 121*a*, a connector 121*e* for electrically connecting a circuit on the substrate 121*a* and a power supply target is mounted.

The stay 122 is a plate-like member that extends in the X direction and the Z direction and is elongated in the X direction. The stay 122 is positioned on the Y direction side with respect to the power supply board 121 and supports the power supply board 121. The power supply board 121 is fixed to the stay 122 with a plurality of screws 123.

The duct cover 124 is an elongated member extending in the X direction, and has a substantially U-shaped (rectangular shape opened on the Y direction side) cross-section opened on the substantially Y direction side in acrosssection perpendicular to the X direction. The duct cover 124 covers at least a part of the power supply board 121 from the −Y direction side.

The stay 122 serving as a first member and the duct cover 124 serving as a second member are combined to form a substantially tubular duct 126 extending in the X direction. That is, the stay 122 and the duct cover 124 are examples of a duct member forming an air flow path. At least apart (in particular, electric components constituting the power supply circuit) of the power supply board 121 is disposed in the internal space of the duct 126.

The fan unit 125 is disposed at an end on the −X direction side (upstream side in the air blowing direction) of the duct 126. The fan unit 125 is connected to the −X direction-side end of the duct cover 124 (the upstream end 124*a* of the duct 126). The configuration of the fan unit 125 will be described below.

The power supply inlet 116 is electrically connected to the power supply board 121 by a bundle wire 127. Power from a commercial power supply is supplied to the power supply board 121 via the power supply inlet 116 and the bundle wire 127.

The power supply inlet 116 is preferably disposed adjacent to the power supply board 121. As a result, the length of the bundle wire 127 can be minimized, the component cost of the bundle wire 127 can be reduced, and the electric noise generated from the bundle wire 127 can be reduced.

The flow path formed by the duct member may not have a completely closed shape (tubular shape) in a plane orthogonal to the flow direction as long as air from the fan unit 125 can be guided. In the present embodiment, the width of the duct cover 124 in the Z direction is narrower than the width of the power supply board 121 in the Z direction. Therefore, the internal space of the duct 126 is partitioned by the power supply board 121 into a space between the duct cover 124 and the power supply board 121 and a space between the power supply board 121 and the stay 122.

Fan Unit

Figure 6A:
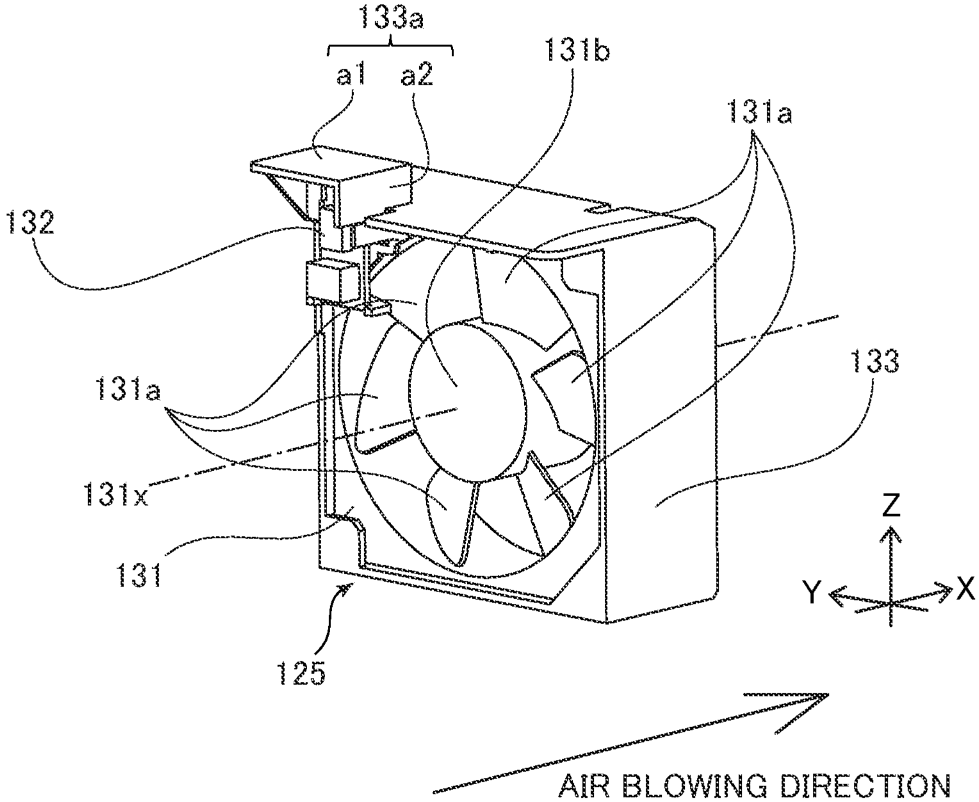
FIG. 6A is a perspective view of a fan unit according to the first embodiment.

The configuration of the fan unit 125 will be described with reference to FIG. 6. The fan unit 125 includes an intake fan 131, an environmental sensor 132, and a holder 133 that fixes these components.

The intake fan 131 is a propeller fan including a rotation shaft 131*b*, a plurality of blades 131*a* radially protruding from the rotation shaft 131*b*, and a driving unit (motor unit) that rotates the rotation shaft 131*b*. The intake fan 131 rotates about the rotational axis 131*x*. The intake fan 131 is an axial-flow-type fan (axial fan) in which the axial direction (rotational axis direction) of the rotation shaft 131*b* coincides with the direction in which air is sent out. In the present embodiment, the intake fan 131 is installed to send air in the X direction. Specifically, the intake fan 131 is disposed such that the rotational axis 131*x* is substantially parallel to the X direction. As the intake fan 131, for example, a mixed flow fan can be used.

The intake fan 131 rotates by power supplied from the power supply board 121, takes in air from the −X direction side, and sends out air in the X direction toward the duct 126.

The holder 133 is configured to surround the periphery of the intake fan 131 when viewed in the X direction, and holds the intake fan 131. The environmental sensor 132 is fixed at a predetermined position of the holder 133. The arrangement of the environmental sensor 132 will be described below.

The holder 133 has an eaves portion 133*a* (overhang portion) protruding toward the −X direction side with respect to the intake fan 131. The eaves portion 133*a* has an upper surface portion a1 that covers the environmental sensor 132 when viewed from above, and a side surface portion a2 on the −Y direction side with respect to the environmental sensor 132. The eaves portion 133*a* can guide outside air taken in from the intake louver 106 toward the intake fan 131.

Environmental Sensor

Figure 7A:
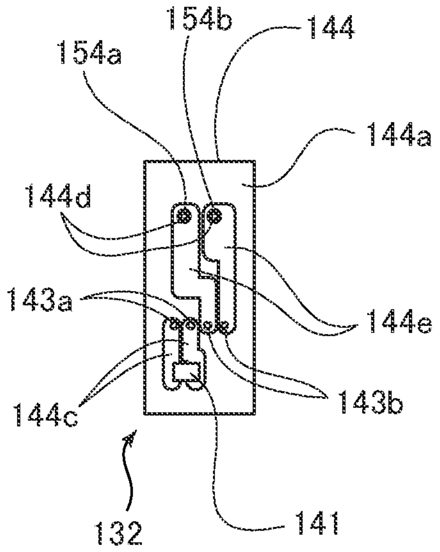
FIGS. 7A and 7B are views respectively illustrating a front surface and a back surface of an environmental sensor according to the first embodiment.
Figure 7B:
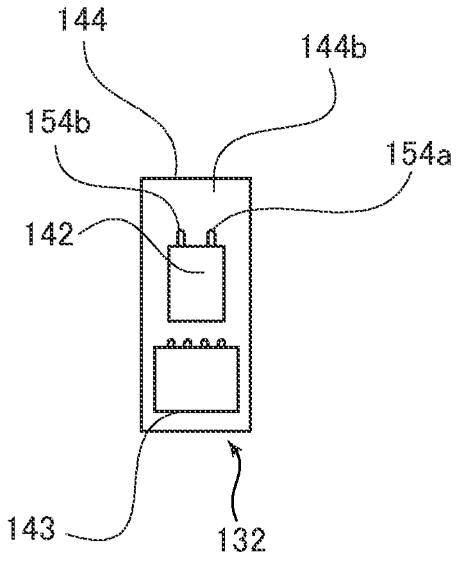

Details of the environmental sensor 132 will be described with reference to FIGS. 7A and 7B. FIG. 7A is a view of the environmental sensor 132 when viewed from one surface (mounting surface 144*a*) side, and FIG. 7B is a view of the environmental sensor 132 when viewed from the other surface (non-mounting surface 144*b*) side.

The environmental sensor 132 includes a sensor substrate 144, a temperature sensor 141, a humidity sensor 142, and a connector 143. The environmental sensor 132 is an example of a sensor unit for detecting an environmental condition (i.e., a state of air around the image forming apparatus) of an environment in which the image forming apparatus is installed. Here, the “environmental conditions” detected by the sensor unit may be any one of temperature and humidity (for example, relative humidity and absolute moisture amount).

The sensor substrate 144 is a plate-shaped circuit board. The sensor substrate 144 has a mounting surface 144*a* (first surface) on which circuit patterns 144*c* and 144*e* are formed, and a non-mounting surface 144*b* which is a surface (second surface) opposite to the mounting surface 144*a* and on which no circuit pattern is formed.

As the temperature sensor 141, for example, a negative temperature coefficient thermistor (NTC thermistor) obtained by mixing and sintering oxides of nickel, manganese, cobalt, iron, and the like is used. In this case, the temperature can be detected by utilizing the property that the resistance value (impedance) of the NTC thermistor decreases as the temperature rises. That is, the temperature sensor 141 outputs a signal (voltage value or the like) corresponding to the ambient air temperature. The controller 113 can detect a temperature (also referred to as an ambient temperature or an ambient temperature of the image forming apparatus) as an environmental condition based on a signal of the temperature sensor 141.

The temperature sensor 141 of the present embodiment is a surface mount component. As illustrated in FIG. 7A, the temperature sensor 141 is mounted on the pair of circuit patterns 144*c* on the mounting surface 144*a* of the sensor substrate 144 by reflow soldering or the like, and is eclectically connected to a pair of terminals 143*a* of the connector 143.

As illustrated in FIG. 7B, the humidity sensor 142 is disposed on the non-mounting surface 144*b* of the sensor substrate 144. Connection terminals 154*a* and 154*b* of the humidity sensor 142 pass through a pair of through-holes 144*d* opened in the sensor substrate 144, and are soldered to the circuit pattern 144*e* on the mounting surface 144*a*. As a result, the humidity sensor 142 is fixed and electrically connected to the terminal 143*b* of the connector 143.

Figure 8:
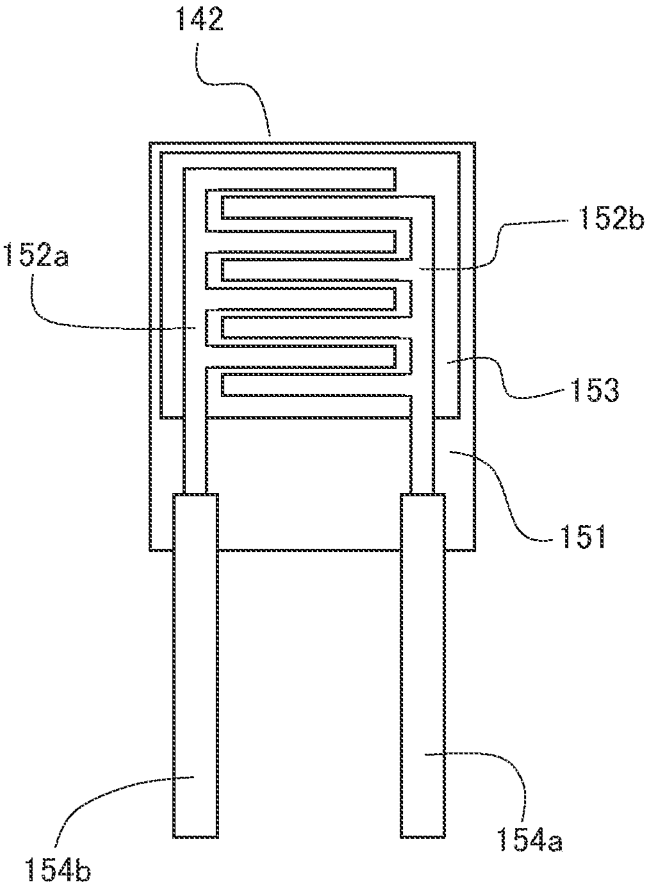
FIG. 8 is a diagram illustrating a configuration of a humidity sensor according to the first embodiment.

The structure and principle of the humidity sensor 142 will be described with reference to FIG. 8. The humidity sensor 142 of the present embodiment is a resistance-change-type sensor. The humidity sensor 142 includes a substrate 151 made of alumina or the like, a pair of comb-shaped electrodes 152*a* and 152*b* formed on the substrate 151, and a moisture-sensitive film 153 formed by applying a polymer material. The comb-shaped electrodes 152*a* and 152*b* are formed by, for example, printing and firing a noble metal-thick film conductor such as gold or ruthenium oxide in a comb shape. Further, the comb-shaped electrodes 152*a* and 152*b* are electrically connected to the pair of connection terminals 154*a* and 154*b*.

When the humidity around the humidity sensor 142 increases and the number of water molecules in the air adsorbed to the moisture-sensitive film 153 increases, the number of movable ions of the moisture-sensitive film 153 increases, and the impedance between the comb-shaped electrodes 152*a* and 152*b* decreases, whereby the humidity can be detected. That is, the temperature sensor 141 outputs an alternating current when, for example, an AC voltage is applied as a signal corresponding to the ambient humidity. The controller 113 can detect humidity (ambient humidity of the image forming apparatus) as an environmental condition on the basis of a signal (amplitude of alternating current) of the humidity sensor 142.

The connector 143 (FIG. 7B) is electrically connected to the controller 113 via an electric wire (not illustrated). The controller 113 detects temperature and humidity on the basis of changes in resistance values and impedance of the temperature sensor 141 and the humidity sensor 142, and uses the detected temperature and humidity for control of the image forming apparatus 1.

As described above, the environmental sensor 132 has a configuration in which the temperature sensor 141 is disposed on the mounting surface 144*a* and the humidity sensor 142 is disposed on the opposite surface of the non-mounting surface 144*b*. As a result, there is an advantage that the environmental sensor 132 is less likely to obstruct the air flow, and the degree of freedom in arrangement of the environmental sensor 132 increases.

Figure 9:
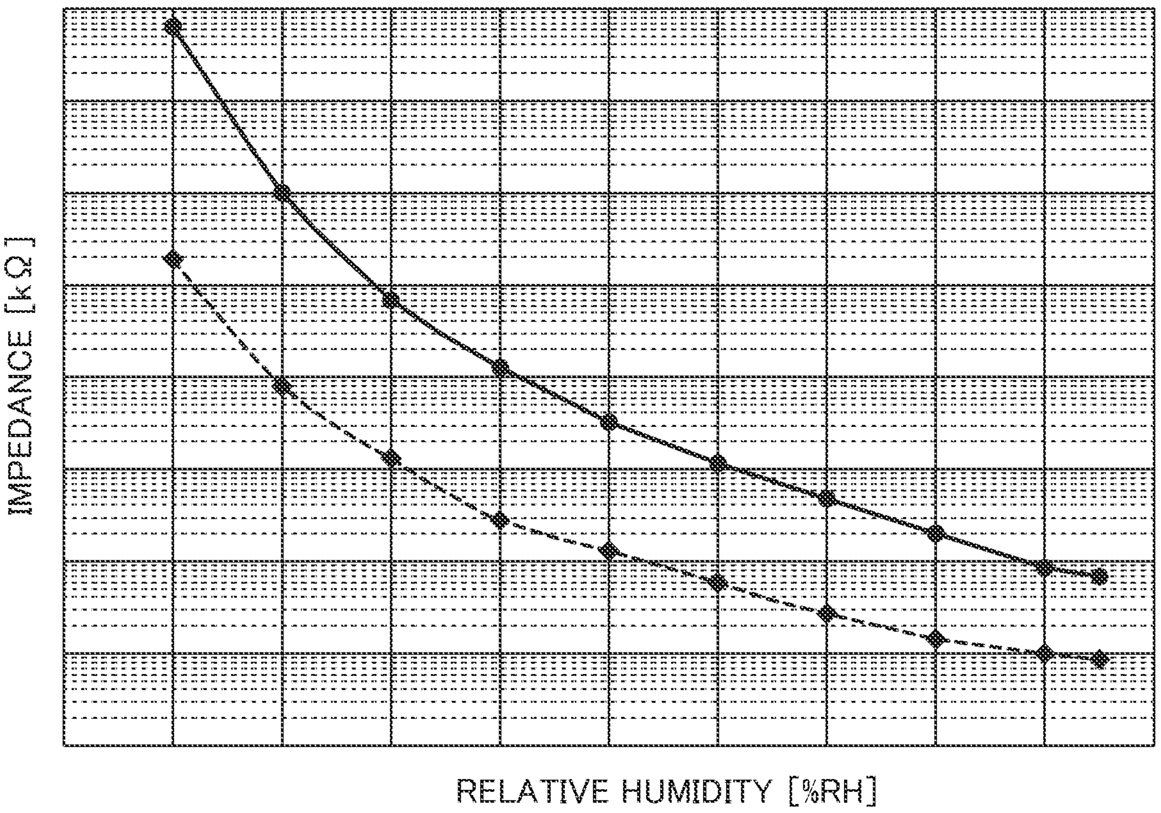
FIG. 9 is a graph illustrating a relationship between temperature and humidity and impedance of the humidity sensor according to the first embodiment.

FIG. 9 is an example of a measurement result indicating the relationship between the relative humidity and the temperature and the impedance of the resistance-change-type humidity sensor 142 used in the present embodiment. In FIG. 9, the horizontal axis represents relative humidity and the vertical axis represents impedance, and among the two curves, a broken line represents measurement results in a low temperature environment and a solid line represents measurement results in a high temperature environment.

As can be seen from the figure, the impedance of the humidity sensor 142 varies depending on both the relative humidity and the temperature. Therefore, in order to accurately detect the relative humidity, it is required to accurately grasp the temperature of the humidity sensor 142.

The image forming apparatus 1 of the present embodiment performs various controls using the temperature and humidity around the image forming apparatus 1 detected by the environmental sensor 132. As an example, the target temperature of the fixing unit 20 is changed to an optimum fixing temperature according to the ambient temperature. In addition, the absolute moisture amount in the air is calculated from the ambient temperature and humidity, the process conditions (for example, the values of the applied voltages) of the charging step, the developing step, and the transfer step are changed, and calibration is executed according to values of or changes in the ambient temperature. Therefore, it is desirable that the temperature or humidity detected by the environmental sensor 132 accurately reflect the actual temperature or humidity around the image forming apparatus.

Air Flow in Casing

Figure 10:
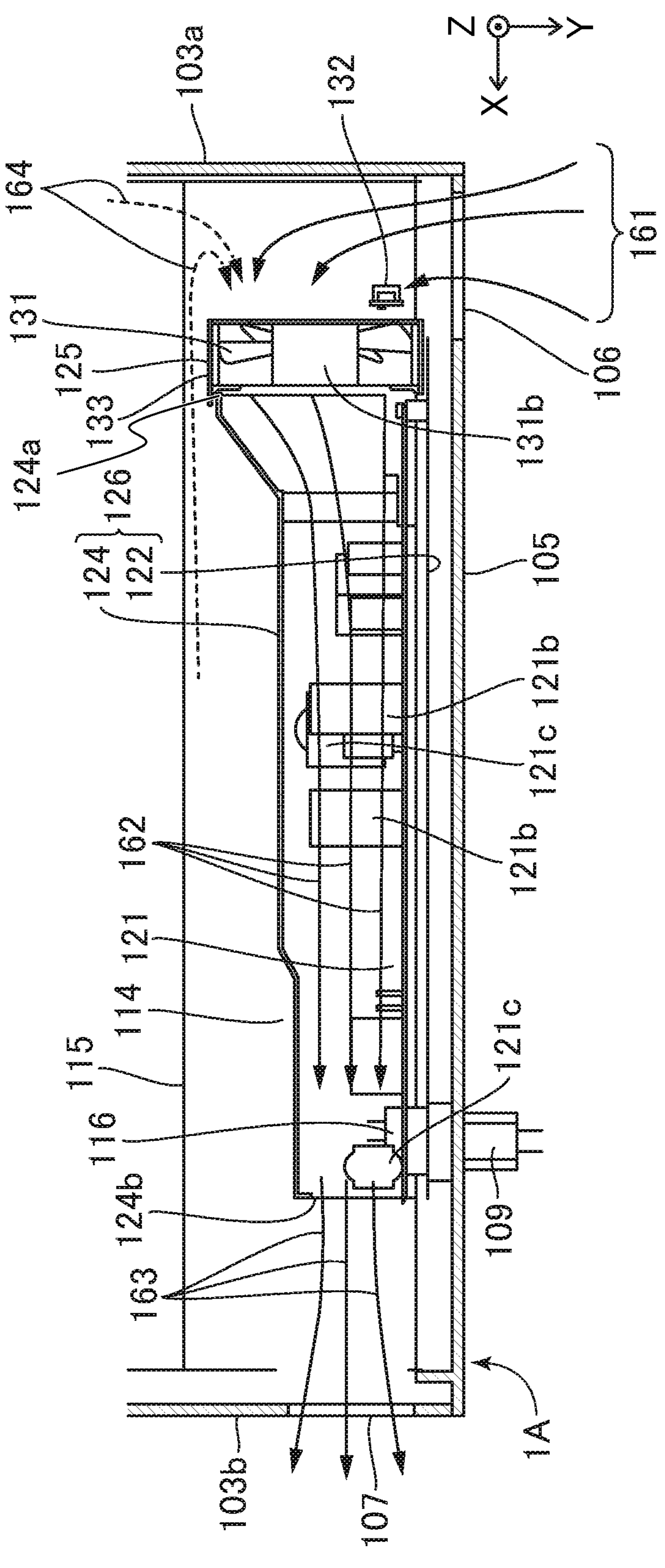
FIG. 10 is a cross-sectional view illustrating a flow of air inside the image forming apparatus according to the first embodiment.

A main path of an air flow generated by the intake fan 131 will be described with reference to FIG. 10. FIG. 10 is a cross-sectional view of the image forming apparatus 1 taken along a horizontal plane (XY plane) at the height of the cutting line A-A illustrated in FIG. 2, and illustrates only a part of the back side (Y direction side) of the image forming apparatus 1.

As illustrated in FIG. 10, the intake louver 106 serving as an air inlet opening is provided at an end on the −X direction side of the back surface cover 105 (cover member or first cover member) constituting the exterior surface on the Y direction side of the casing 1A. The discharge louver 107 serving as the air outlet opening is provided at the end on the Y direction side of the side surface cover 103*b* (another cover member or second cover member) constituting the exterior surface on the X direction side of the casing 1A. Therefore, the discharge louver 107 is provided at a position downstream of the intake louver 106 in the X direction. The air inlet opening or the air outlet opening may have a large number of holes disposed in a mesh pattern or a grid pattern, for example.

The low-voltage power supply unit 114 is disposed between the upstream end 106*a* of the intake louver 106 and the discharge louver 107 in the X direction, and is elongated in the X direction. The duct 126 of the low-voltage power supply unit 114 extends in the X direction substantially parallel to the back surface cover 105. In other words, the duct 126 extends in the X direction from the intake louver 106 toward the discharge louver 107. The fan unit 125 is disposed at an upstream end of the low-voltage power supply unit 114 in the X direction (an upstream end of the duct 126).

The low-voltage power supply unit 114 is disposed such that the fan unit 125 connected to the upstream end 124*a* of the duct 126 is positioned near the intake louver 106 and the other end (downstream end 124*b*) of the duct 126 is positioned near the discharge louver 107. In the present embodiment, the intake fan 131 is positioned at a position at least partially overlapping the intake louver 106 when viewed from the Y direction side (opening side of the intake louver 106). The opening at the downstream end 124*b* of the duct 126 is positioned at a position at least partially overlapping the discharge louver 107 when viewed from the X direction side (the opening side of the discharge louver 107).

A flow of air around the low-voltage power supply unit 114 will be described. The electric components (electric elements) on the power supply board 121 generate heat when operating by consuming electric power. The power supply board 121 of the present embodiment includes electric components constituting a power supply circuit that generates a direct current, and thus the amount of heat generation tends to be large. When the temperature of the electric components increases, there is a possibility that power consumption increases due to thermal resistance, or malfunction or failure due to overheating occurs. Therefore, in the present embodiment, the power supply board 121 is actively cooled by the air flow generated by the intake fan 131.

The intake fan 131 of the fan unit 125 generates an air flow by sending the air taken in from the upstream side in the X direction (−X direction side) to the downstream side in the X direction. As a result, the intake fan 131 sends the outside air (arrow 161) taken in from the outside of the casing 1A through the intake louver 106 toward the downstream side in the X direction, and sends the outside air into the duct 126 (arrow 162).

The electric components (121*b* to 121*d*) on the power supply board 121 disposed in the duct 126 are cooled by the air flow (arrow 162). The air flow (arrow 163) discharged from the downstream end 124*b* of the duct 126 is discharged to the outside of the casing 1A through the discharge louver 107.

Arrangement of Environmental Sensor

Next, the arrangement of the environmental sensor 132 will be described in detail. As described above, while the intake fan 131 sucks air outside the casing 1A via the intake louver 106, air inside the casing 1A is also slightly sucked as indicated by a broken arrow 164 in FIG. 10.

Since the air in the casing is heated by heat generated by a heat source such as the main drive unit 111, the controller 113, and the fixing unit 20 in the process of the image forming operation, the temperature gradually increases during the execution of the continuous image forming job. In addition, the humidity inside the image forming apparatus 1 may deviate from the outside air due to the water vapor evaporated from the recording material. Therefore, in the vicinity of the environmental sensor 132, when the ratio of the air inside the image forming apparatus 1 intermingled with the air (outside air) taken in from the outside of the casing 1A by the intake fan 131 increases, the detection accuracy of the temperature or humidity by the environmental sensor 132 may decrease.

Therefore, in the present embodiment, by defining the arrangement of the environmental sensor 132 in relation to the element (for example, the intake fan 131 and the intake louver 106) that determines the direction of the air flow generated by the intake fan 131, the decrease in the detection accuracy of the environmental sensor 132 is reduced. In other words, the environmental sensor 132 is disposed at a position as far as possible from the path (arrow 161) through which the air in the casing is sucked into the intake fan 131 in the main air flow path (arrow 164) from the intake louver 106 to the intake fan 131.

Figure 11:
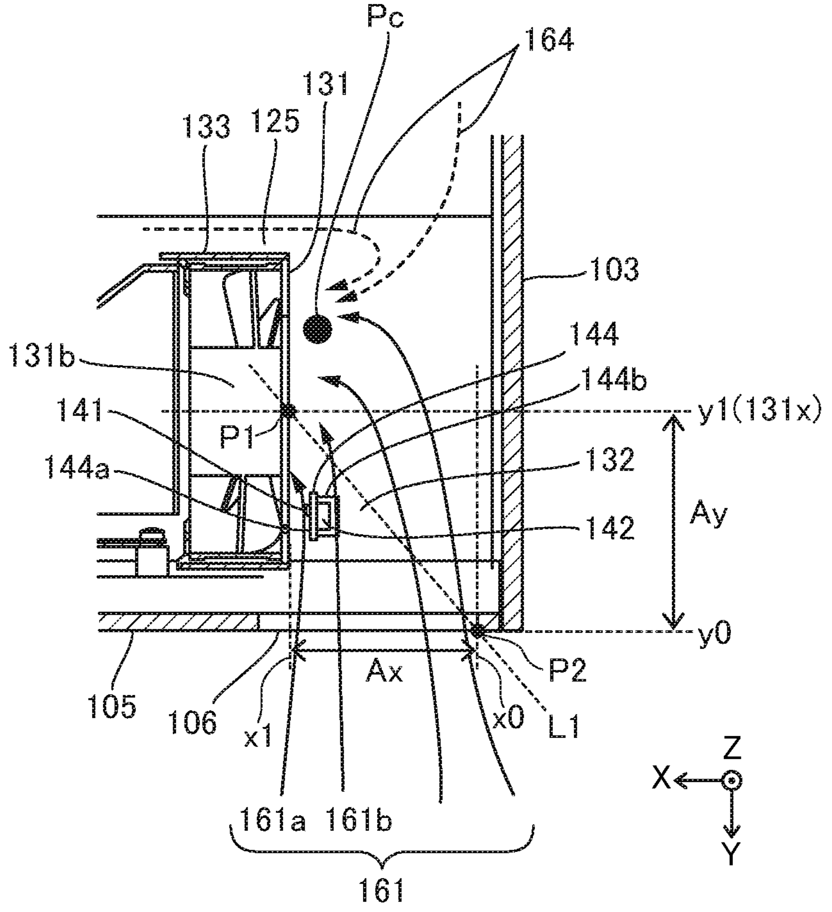
FIG. 11 is an enlarged view illustrating a flow of air around the environmental sensor according to the first embodiment.

Hereinafter, a specific arrangement of the environmental sensor 132 will be described with reference to FIGS. 11 and 6B. FIG. 11 is an enlarged view of a part of FIG. 10.

As illustrated in FIG. 11, in the Y direction, the environmental sensor 132 is positioned in an area Ay from a position y0 of the intake louver 106 in the back surface cover 105 to a position y1 (a position of the rotational axis 131*x*) of the rotation shaft 131*b* of the intake fan 131. In the X direction, the environmental sensor 132 is disposed on the upstream side (−X direction side) of the intake fan 131. In other words, the sensor unit of the present embodiment is arranged within the region (Ay) between the air inlet opening and the rotational axis of the fan in the first direction (Y direction), and is arranged on the upstream side of the fan in the second direction (X direction).

With this arrangement, at least a part of the environmental sensor 132 is positioned in a main path (arrow 161) through which air flows when viewed in the Z direction. On the other hand, since the environmental sensor 132 is disposed while avoiding the region on the Y direction side with respect to the rotation shaft 131*b*, it is possible to reduce the possibility that the detection accuracy of the environmental sensor 132 is lowered by the air (arrow 164) from the casing.

By the way, it is also conceivable to isolate the environmental sensor 132 from a heat source (another heat source) other than the low-voltage power supply unit 114 in the casing by a method of connecting the intake louver 106 and the intake fan 131 by a tubular member (duct) and arranging the environmental sensor 132 therein. As a result, the influence of the air heated by another heat source on the detection accuracy of the environmental sensor 132 may be reduced. However, in this configuration, the number of parts and the number of assembling steps are increased due to the tubular member and the mounting structure thereof, which leads to an increase in size and complexity of the image forming apparatus. According to the present embodiment, it is possible to reduce the influence of the air heated by another heat source on the detection accuracy of the environmental sensor 132 with a simple configuration. In the present embodiment, since the space between the intake louver 106 and the intake fan 131 is an open space, a part of heat generated by another heat source can be discharged to the outside of the casing through the path passing through the duct 126 and the discharge louver 201. However, the above description does not prevent addition of a fan or a ventilation port other than the intake fan 131, the intake louver 106, and the discharge louver 107 of the present embodiment.

When the intake louver 106 is separated from the side surface cover 103*a* in the X direction, the environmental sensor 132 may be disposed in the region Ax from the upstream end position x0 of the intake louver 106 to the position x1 of the upstream surface of the intake fan 131 in the X direction.

As illustrated in FIG. 11, when viewed in the Z direction, the environmental sensor 132 is desirably disposed such that at least a part (preferably all) of the environmental sensor 132 is positioned on the same side as the downstream end 106*b* of the intake louver 106 with respect to the imaginary line L1 connecting the point P1 and the point P2. The Z direction is a direction orthogonal to both the first direction (Y direction) and the second direction (X direction). The point P1 (first point) is a point at a position (y1) on the rotational axis of the intake fan 131 in the Y direction and at a position (x1) on the upstream surface of the intake fan 131 in the X direction. The point P2 (second point) is a point at an upstream end position (x0, y0) of the intake louver 106 in the X direction.

With this arrangement, the intake fan 131 is more likely to be exposed to the outside air taken in through the intake louver 106 and less likely to be exposed to the air from inside the casing, so that the possibility that the detection accuracy of the environmental sensor 132 is lowered can be further reduced.

Figure 6B:
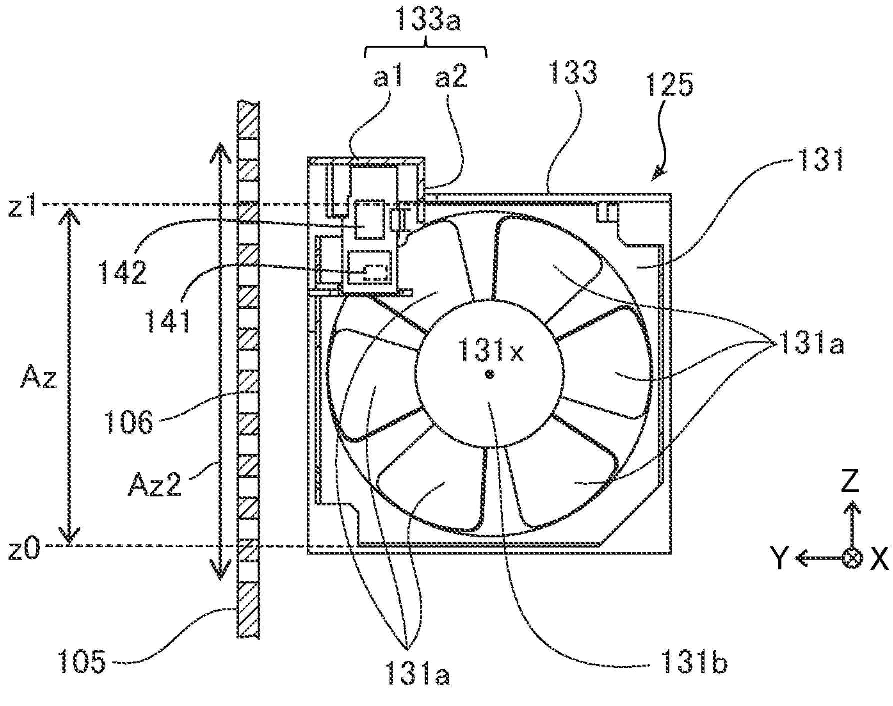
FIG. 6B is an axial side view of the fan unit according to the first embodiment.

As illustrated in FIG. 6B, at least a part of the environmental sensor 132 is preferably positioned in an area Az from the lower end position z0 to the upper end position z1 of the intake fan 131 in the Z direction (vertical direction). The environmental sensor 132 is preferably disposed such that at least a part of the environmental sensor 132 overlaps the intake fan 131 when viewed in the direction (X direction) of the rotation shaft 132*b* of the intake fan 131. With this arrangement, the intake fan 131 is more likely to be exposed to the outside air taken in through the intake louver 106 and less likely to be exposed to the air from inside the casing, so that the possibility that the detection accuracy of the environmental sensor 132 is lowered can be further reduced.

As illustrated in FIGS. 2B and 6B, the environmental sensor 132 is preferably positioned within an area where the intake louver 106 as the air inlet opening is provided when viewed in the Y direction (first direction). The range in which the intake louver 106 is provided is defined by a range Ax2 from one end position to the other end position of the intake louver 106 in the X direction and a range Az2 from one end position to the other end position of the intake louver 106 in the Z direction. This arrangement allows the intake fan 131 to be easily exposed to the outside air taken in through the intake louver 106.

In the arrangement of the environmental sensor 132 described above, when a part of the environmental sensor 132 is disposed in a predetermined region or position, the position of the sensor element is preferably positioned in the region or position. The sensor element is an element whose electrical characteristic (resistance value, impedance, and the like) changes according to temperature or humidity in order to convert a physical quantity to be detected into an electrical signal. In the present embodiment, the NTC thermistor and the moisture-sensitive film 153 correspond to a sensor element.

Furthermore, as illustrated in FIG. 11, the environmental sensor 132 is preferably arranged such that the sensor substrate 144 is substantially perpendicular to the back surface cover 105 (direction perpendicular to the XZ plane). In other words, the sensor substrate 144 is preferably substantially perpendicular to the back surface cover 105 having the intake louver 106. With this configuration, the projected area of the sensor substrate 144 in the direction (−Y direction) of the air flow taken in from the intake louver 10 toward the inside of the casing can be reduced, and the resistance (energy loss) when taking in the outside air by the intake fan 131 can be reduced.

In addition, with this configuration, as indicated by arrows 161*a* and 161*b* in FIG. 11, outside air can be applied substantially evenly to both the temperature sensor 141 and the humidity sensor 142 mounted separately on the mounting surface 144*a* and the non-mounting surface 144*b* of the sensor substrate 144. As a result, the temperatures can be kept substantially uniform on both surfaces of the sensor substrate 144, and the accuracy of the temperature detection and the accuracy of the humidity detection depending on the accuracy of the temperature detection can be enhanced.

Verification Result of Detection Accuracy

Figure 12:
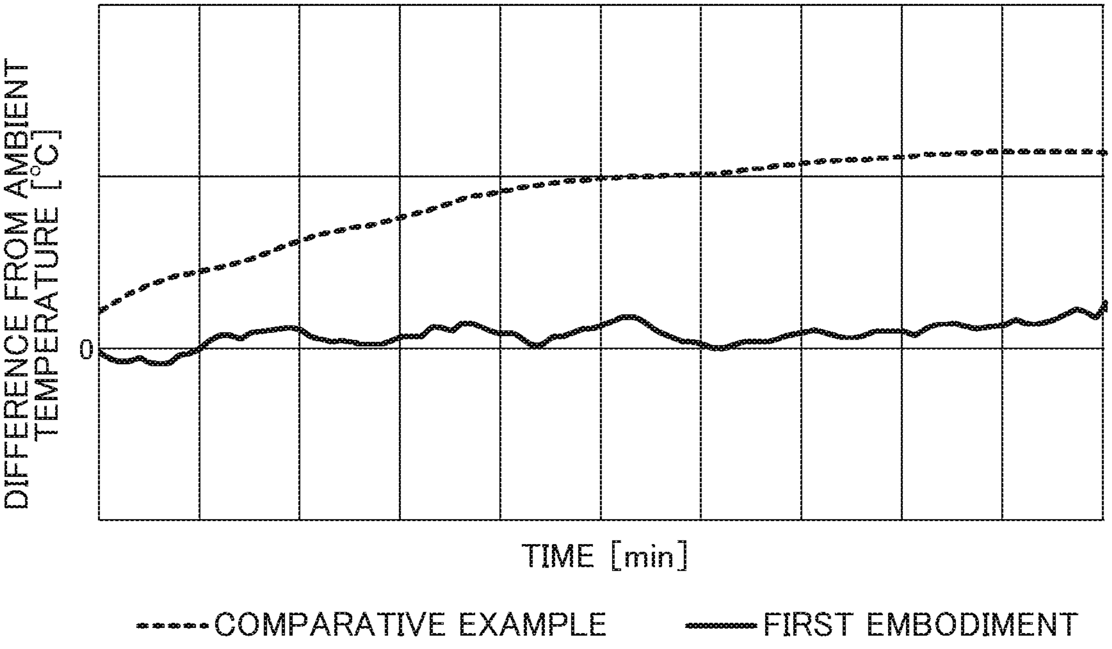
FIG. 12 is a graph illustrating temperature detection results of environmental sensors in the first embodiment and a Comparative Example.

FIG. 12 is a graph illustrating a transition of the detection temperature of the environmental sensor 132 during execution of the continuous image forming job. The horizontal axis represents the elapsed time from the start of the job, and the vertical axis represents the difference between the ambient temperature of the image forming apparatus 1 and the detected temperature obtained from the measured value (impedance) of the temperature sensor 141.

In FIG. 12, a solid line represents a result in a case where the environmental sensor 132 is disposed at the position (FIG. 11) of the present embodiment, and a broken line represents a result in a case where the environmental sensor 132 is disposed at the position of the point Pc in FIG. 11 as a comparative example. That is, in this comparative example, the environmental sensor 132 is disposed on the side (on the inner side of the casing) farther from the intake louver 106 than the rotation shaft 132*b* of the intake fan 131 in the Y direction. The ambient temperature during the experiment was constant.

As can be seen from FIG. 12, in the comparative example, the detection result of the temperature gradually deviates from the actual ambient temperature due to the influence of the air warmed in the casing during the execution of the continuous image forming job. In addition, when the temperature detection result deviates, the humidity detection result also deviates from the actual ambient humidity. On the other hand, by arranging the environmental sensor 132 at the position of the present embodiment, it has been possible to reduce the fluctuation of the signal of the environmental sensor 132 due to the influence of the air heated in the casing during the execution of the continuous image forming job.

Second Embodiment

An image forming apparatus 1 according to a second embodiment will be described with reference to FIGS. 13 and 14. The present embodiment is different from the first embodiment m the arrangement of the air outlet openings. Hereinafter, elements denoted by the same reference numerals as those in the first embodiment have substantially the same configurations and functions as those described in the first embodiment, and portions different from those in the first embodiment will be mainly described.

Figure 13:
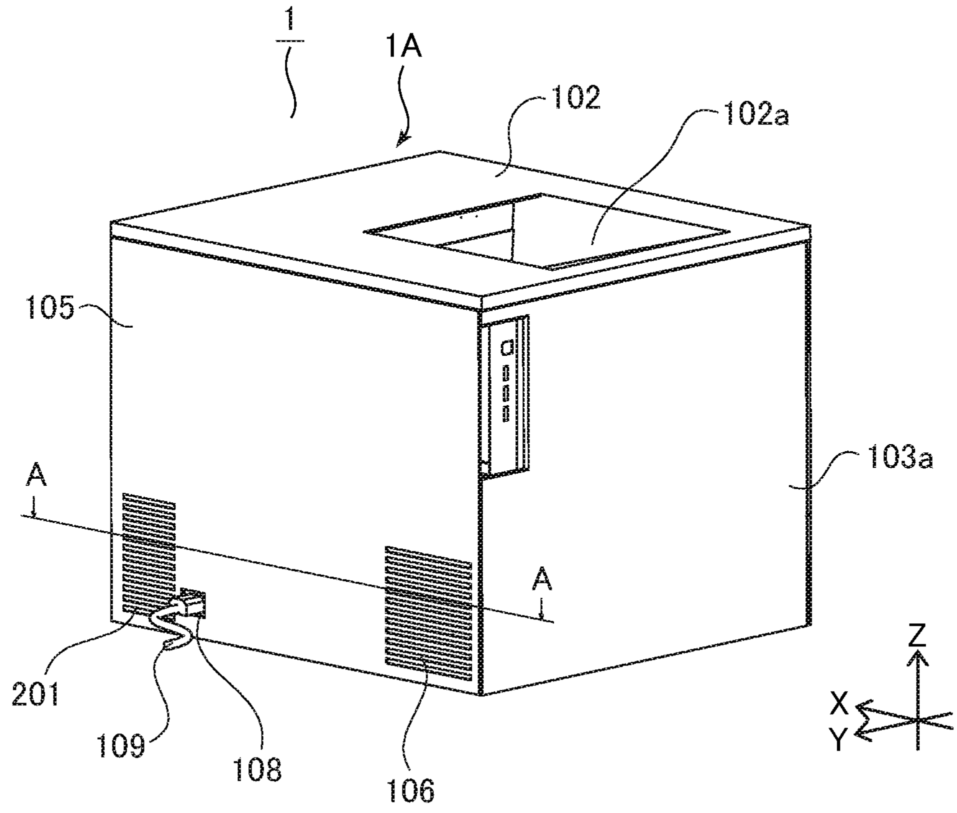
FIG. 13 is an external view of an image forming apparatus according to a second embodiment when viewed from the back side.

FIG. 13 is a perspective view of the image forming apparatus 1 when viewed from the back side. FIG. 14 is a cross-sectional view of the image forming apparatus 1 taken along a horizontal plane (XY plane) at the height of the cutting line A-A illustrated in FIG. 13, and illustrates only a part of the back side (Y direction side) of the image forming apparatus 1.

As illustrated in FIG. 13, the discharge louver 201 of the present embodiment is provided in the back surface cover 105. That is, the back surface cover 105 as the cover member includes the intake louver 10 as the air inlet opening and the discharge louver 201 as the air outlet opening. The discharge louver 201 is provided at a position downstream of the intake louver 106 in the X direction.

In the present embodiment, the intake louver 106 is disposed at the upstream end in the X direction in the lower portion of the back surface cover 105, and the discharge louver 201 is disposed at the downstream end in the X direction in the lower portion of the back surface cover 105. In the back surface cover 105, a cord hole 108 through which the power cord 109 is inserted is provided between the intake louver 106 and the discharge louver 201 in the X direction.

Figure 14:
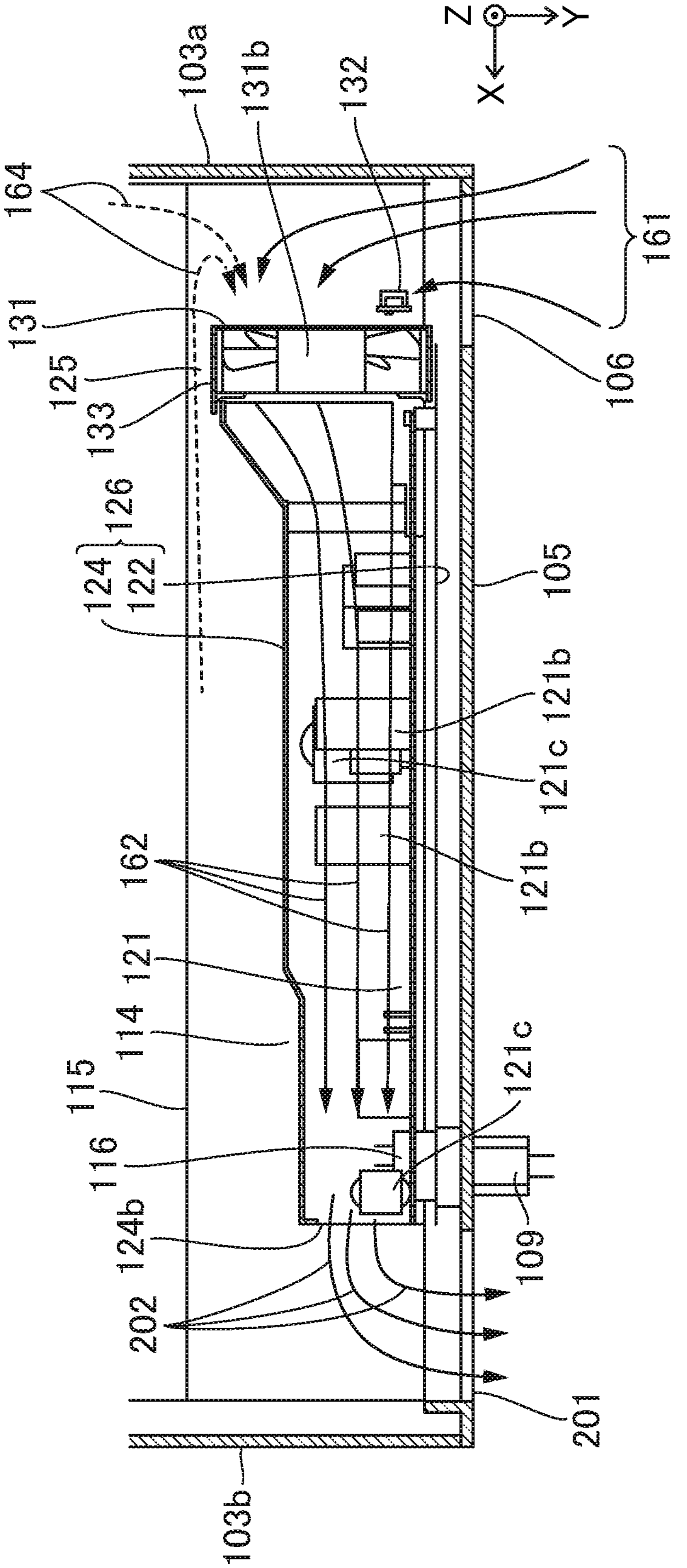
FIG. 14 is a cross-sectional view illustrating a flow of air inside the image forming apparatus according to the second embodiment.

As illustrated in FIG. 14, the intake fan 131 of the fan unit 125 generates an air flow by sending out air taken in from the upstream side in the X direction (−X direction side) to the downstream side in the X direction. As a result, the intake fan 131 sends outside air (arrow 161) taken in from the outside of the casing 1A through the intake louver 106 into the duct 126 (arrow 162).

This air flow cools the electric components (121*b* to 121*d*) on the power supply board 121. The air flow (arrow 163) flowing out of the duct 126 from the downstream end 124*b* of the duct 126 is discharged to the outside of the casing 1A through the discharge louver 107.

In the present embodiment, the arrangement of the environmental sensor 132 with respect to the intake fan 131, the intake louver 106, and the like is the same as that in the first embodiment. Therefore, it is possible to reduce the possibility that the detection accuracy of the environmental sensor 132 is lowered by the air (arrow 164) from the inside of the casing.

In addition, in the present embodiment, since the intake louver 106 (air inlet opening) and the discharge louver 201 (air outlet opening) are disposed in the back surface cover 105, noise propagated to the front side of the image forming apparatus 1 can be reduced as compared with the first embodiment.

The intake fan 131 generates noise such as vibration sound and flowing air sound during operation. These noises leak from the intake louver 106 and the discharge louvers 107 and 201 provided near the intake fan 131 to the outside of the casing 1A. In addition, the intake fan 131 is controlled to cool the power supply board 121 that has generated heat during the job not only during the image forming operation, but also for a predetermined period after the end of the job, for example, when a continuous image forming job is executed. In such a case, since the electrophotographic mechanism 1B, the motor for conveying the recording material, and the like are not operated, the noise caused by the intake fan 131 is easily noticeable.

According to the present embodiment, since both the intake louver 106 and the discharge louver 201 are provided on the back side of the casing 1A, it is possible to reduce the volume of noise transmitted to the user who often stands on the front side of the image forming apparatus 1.

Third Embodiment

An image forming apparatus 1 according to a third embodiment will be described with reference to FIG. 15. In the present Example, an air blocking portion is added to the configuration of the second embodiment. Hereinafter, elements denoted by the same reference numerals as those in the first embodiment have substantially the same configurations and functions as those described in the first embodiment, and portions different from those in the first embodiment will be mainly described.

Figure 15:
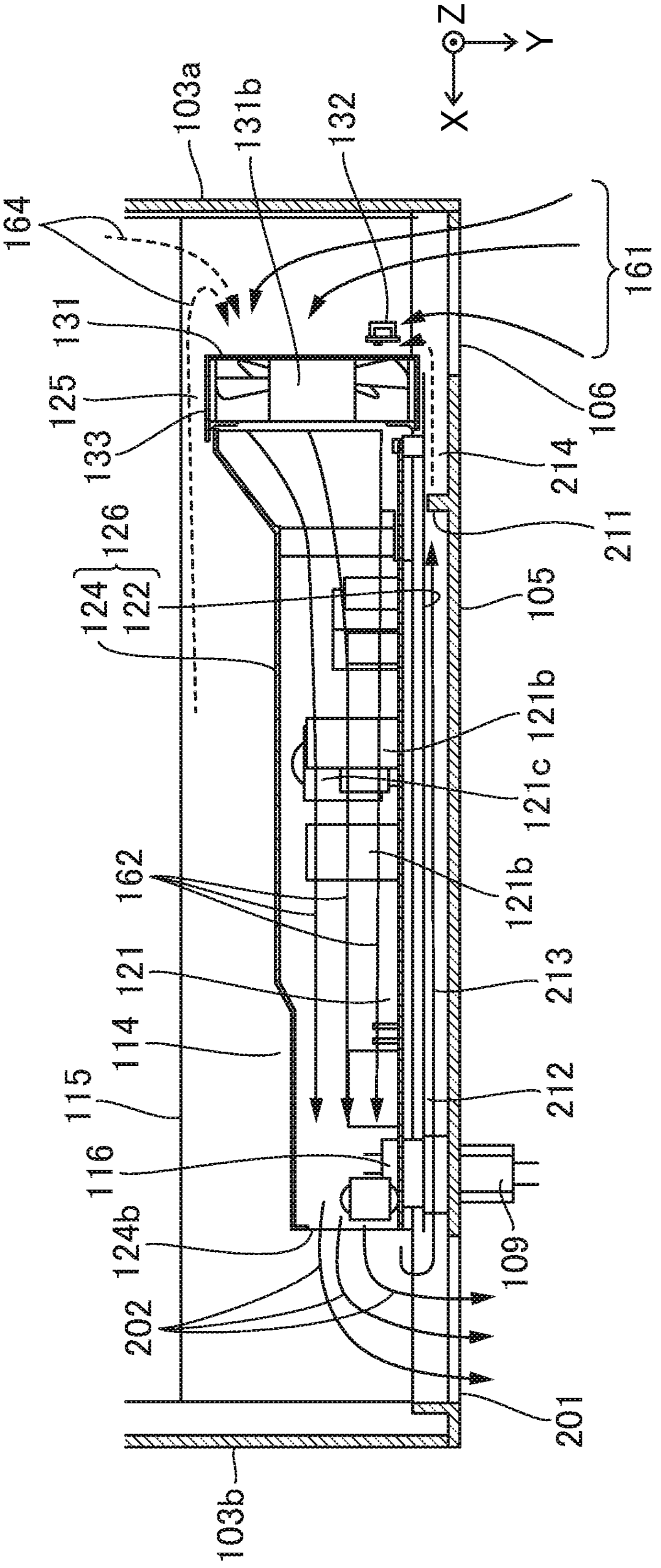
FIG. 15 is a cross-sectional view illustrating a flow of air inside an image forming apparatus according to a third embodiment.

FIG. 15 is a cross-sectional view of the image forming apparatus 1 taken along a horizontal plane (XY plane) at the height of the cutting line A-A illustrated in FIG. 13, and illustrates only a part of the back side (Y direction side) of the image forming apparatus 1.

As illustrated in FIG. 15, the image forming apparatus 1 of the present embodiment is provided with an air blocking wall 211 that closes a gap 212 between the inner surface of the back surface cover 105 and the stay 122 of the low-voltage power supply unit 114 (the outer surface of the duct 126). The air blocking wall 211 is formed so as to protrude in the Y direction or the −Y direction from at least one of the inner surface of the back surface cover 105 or the outer surface of the duct 126 facing each other toward the other. The air blocking wall 211 extends in the Z direction. In the illustrated example, the air blocking wall 211 is formed integrally with the back surface cover 105 so as to protrude in the −Y direction from the inner surface of the back surface cover 105.

The air blocking wall 211 functions as the air blocking portion that blocks or shields a part of the air flow (arrow 202, 211) discharged from the downstream end 124*b* of the duct 126 from flowing back in the −X direction through the gap 212 between the duct 126 and the back surface cover 105. Since the air blocking wall 211 is provided, it is possible to block the air (arrow 213) that has entered the gap 212 after being heated at the time of cooling the power supply board 121 from reaching the environmental sensor 132 and the intake fan 131. As a result, the possibility that the detection accuracy of the environmental sensor 132 is lowered can be reduced. In addition, the cooling efficiency of the power supply board 121 can be enhanced.

Although FIG. 15 illustrates an example in which the discharge louver 201 are provided in the back surface cover 105 as in the second embodiment, the air blocking wall 211 may be provided in a configuration in which the discharge louver 107 are provided in the side surface cover 103*b* as in the first embodiment.

The air blocking wall 211 does not need to be integrated with the back surface cover 105 or the duct 126, and may be a separate component, for example, may be formed of a sponge-like member.

The air blocking wall 211 is not limited to completely block the gap between the back surface cover 105 and the duct 126. As a result of the verification, when the gap between the air blocking wall 211 and the back surface cover 105 was 2 mm or less, the influence on the environmental sensor 132 could be sufficiently reduced.

Other Modifications

In each of the embodiments described above, the case where the present technology is applied to the color image forming apparatus including the image forming unit of the intermediate transfer system has been described. The image forming apparatus is not limited thereto, and may include, for example, a direct-transfer-type image forming unit that transfers a toner image formed on an image bearing member to a recording material without passing an intermediate transfer body. Further, the present technology may be applied to a monochrome image forming apparatus including only one image bearing member. Furthermore, not limited to the electrophotographic method, for example, an image forming unit of an inkjet method or an offset printing method may be provided.

The "image forming apparatus" is not limited to a single-function printer that forms an image based on image data received from the outside, and a copier that forms an image based on image data read from a document may be a multifunction peripheral having a plurality of functions.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070168, filed on Apr. 21, 2022, which is hereby incorporated by reference herein in its entirety.

What is claimed is:

1. An image forming apparatus comprising:

a casing accommodating an image forming unit that is configured to form an image on a recording material;

a fan disposed inside the casing and configured to generate an air flow;

a duct member disposed inside the casing and configured to form a flow path for the air flow;

an electric component disposed inside the duct member;

a sensor unit disposed inside the casing and configured to detect an environmental condition around the casing; and an air blocking portion, wherein the casing includes a cover member constituting at least a part of an exterior surface of the casing in a first direction, an air inlet opening provided in the cover member, and an air outlet opening provided at a position downstream of and away from the air inlet opening with respect to a second direction along the cover member, wherein the fan is configured to take in air from an upstream side with respect to the second direction and blow out the air to a downstream side with respect to the second direction such that the air flow flowing through the air inlet opening, the fan, the duct member, and the air outlet opening is generated, wherein the sensor unit is arranged within a region between the air inlet opening and a rotational axis of the fan with respect to the first direction, and is arranged on an upstream side of the fan with respect to the second direction, and wherein the air blocking portion protrudes from at least one of an outer surface of the duct member and an inner surface of the cover member toward the other of the outer surface of the duct member and the inner surface of the cover member, is provided between the air inlet opening and the air outlet opening with respect to the second direction, and is configured to block a flow of air toward the upstream side with respect to the second direction through a gap between the outer surface of the duct member and the inner surface of the cover member.

2. The image forming apparatus according to claim 1, wherein the sensor unit is disposed downstream of an upstream end position of the air inlet opening with respect to the second direction.

3. The image forming apparatus according to claim 1, wherein when viewed in a direction orthogonal to both the first direction and the second direction, at least a part of the sensor unit is positioned on a same side as a downstream end position of the air inlet opening with respect to an imaginary line connecting a first point and a second point, wherein the first point is a point at a position of the rotational axis of the fan in the first direction and at a position of an upstream surface of the fan in with respect to the second direction, and wherein the second point is a point at an upstream end position of the air inlet opening with respect to the second direction.

4. The image forming apparatus according to claim 1, wherein at least a part of the sensor unit is positioned within an area in which the air inlet opening is provided when viewed in the first direction.

5. The image forming apparatus according to claim 1, wherein at least a part of the sensor unit overlaps the fan when viewed from the upstream side with respect to the second direction.

6. The image forming apparatus according to claim 1, wherein at least a part of the sensor unit is positioned in a region between a lower end position of the fan and an upper end position of the fan with respect to a vertical direction.

7. The image forming apparatus according to claim 1, wherein the sensor unit includes a temperature sensor configured to output a detection signal according to an ambient temperature and a humidity sensor configured to output a detection signal according to an ambient humidity.

8. The image forming apparatus according to claim 7, wherein the sensor unit further includes a substrate, wherein the temperature sensor is disposed on a first surface of the substrate, and wherein the humidity sensor is disposed on a second surface of the substrate opposite to the first surface.

9. The image forming apparatus according to claim 8, wherein the sensor unit is arranged such that the substrate is perpendicular to the cover member.

10. The image forming apparatus according to claim 7, further comprising:

a controller configured to control the image forming unit, wherein the image forming unit is an electrophotographic unit configured to form the image on the recording material by an electrophotographic process, wherein the controller is configured to change at least one of conditions in the electrophotographic process on a basis of a temperature and humidity detected based on the detection signal from the sensor unit, and wherein the conditions in the electrophotographic process include a voltage applied in a charging step, a voltage applied in a developing step, a voltage applied in a transfer step, and a fixing temperature in a fixing step.

11. The image forming apparatus according to claim 1, wherein the electric component is a component of a power supply circuit that is configured to supply a direct current to a device in the casing.

12. The image forming apparatus according to claim 11, wherein the power supply circuit is configured to supply power to at least one of (i) a motor that is configured to supply a driving force for conveying the recording material or forming an image by the image forming unit, (ii) a fixing unit that is configured to heat the image formed by the image forming unit and to fix the image to the recording material, and (iii) a controller that is configured to control an operation of the image forming apparatus.

13. The image forming apparatus according to claim 11, further comprising:

a circuit board on which the power supply circuit is formed and which extends in a direction intersecting the first direction, wherein the duct member includes a plate-shaped first member extending in parallel to the circuit board and disposed between the circuit board and the cover member with respect to the first direction, and a second member that covers the electric component mounted on the circuit board from a side opposite to the first member with respect to the first direction, and wherein the second member is configured such that at least a part of the air flow generated by the fan passes through a space between the second member and the circuit board.

14. The image forming apparatus according to claim 1, wherein the casing further includes a second cover member constituting at least a part of an exterior surface of the casing on the downstream side with respect to the second direction, and wherein the air outlet opening is provided in the second cover member.

15. The image forming apparatus according to claim 1, wherein the air outlet opening is provided in the cover member.

16. The image forming apparatus according to claim 15, wherein the cover member is provided with an opening which is arranged between the air inlet opening and the air outlet opening with respect to the second direction and through which a power cord for connecting a circuit including the electric component to an external power source is inserted.

17. The image forming apparatus according to claim 1, wherein the cover member is disposed on a back surface of the casing.

18. The image forming apparatus according to claim 1, further comprising:

a holder that holds the fan and is fixed to the casing, wherein the sensor unit is supported by the holder.

19. The image forming apparatus according to claim 1, wherein the fan is an axial fan.

20. The image forming apparatus according to claim 1, wherein the image forming unit includes a plurality of image bearing members, and is configured to form a color image on the recording material by superimposing images of different colors formed on the plurality of image bearing members.

* * * * *